(12) United States Patent
Henderkott (10) Patent No.: US 10,753,884 B2
(45) Date of Patent: Aug. 25, 2020

(54) NONDESTRUCTIVE INSPECTION OF COMPOSITE MATERIALS

(71) Applicant: Rolls-Royce Corporation, Indianapolis, IN (US)

(72) Inventor: Joseph P. Henderkott, Westfield, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 0 days.

(21) Appl. No.: 15/603,389

(22) Filed: May 23, 2017

(65) Prior Publication Data

US 2017/0356849 A1    Dec. 14, 2017

Related U.S. Application Data (60) Provisional application No. 62/349,992, filed on Jun. 14, 2016.

(51) Int. Cl.
| | | |
|---|---|---|
| *G01J 1/58* | (2006.01) | |
| *G01N 21/91* | (2006.01) | |
| *G01N 21/64* | (2006.01) | |
| *G01N 21/84* | (2006.01) | |

(52) U.S. Cl.
CPC .......... *G01N 21/91* (2013.01); *G01N 21/643* (2013.01); *G01N 2021/8472* (2013.01)

(58) Field of Classification Search
CPC .......... G01N 21/6428; G01N 21/6458; G01N 21/64; G01N 21/6408; G01N 2021/6421
See application file for complete search history.

(56) References Cited

U.S. PATENT DOCUMENTS

| | | | | |
|---|---|---|---|---|
| 3,988,924 | A | | 11/1976 | Alburger |
| 4,037,466 | A | | 7/1977 | Alburger |
| 4,191,048 | A | * | 3/1980 | Molina .................. G01M 3/20 252/301.19 |
| 4,400,618 | A | * | 8/1983 | Bupp ..................... G01N 21/91 250/302 |
| 4,621,193 | A | * | 11/1986 | Van Hoye ............. G01N 21/91 250/302 |

(Continued)

FOREIGN PATENT DOCUMENTS

| | | |
|---|---|---|
| CN | 102944501 A | 2/2013 |
| JP | 2013-250095 A | 12/2013 |

OTHER PUBLICATIONS

International Atomic Energy Agency "Non-destructive Testing: A Guidebook for Industrial Management Quality Control Personnel" Training Course Series No. 9, Vienna 1999, p. 1-287.*

(Continued)

*Primary Examiner* — David P Porta
*Assistant Examiner* — Mamadou Faye
(74) *Attorney, Agent, or Firm* — Brinks Gilson & Lione (57) ABSTRACT

Systems and methods associated with nondestructive inspection of composite material components using fluorescent penetrants for detecting undesirable defects in such components are described. Ceramic matrix composite components include high porous surfaces making defect detection challenging, including contributing to excessive bleed back during the process. The systems and methods include a solvent washing of the component prior to inspection.

19 Claims, 3 Drawing Sheets

(56) References Cited

U.S. PATENT DOCUMENTS

| | | | |
|---|---|---|---|
| 5,518,656 A * | 5/1996 | Furuta | C07D 231/06 252/301.19 |
| 7,131,331 B2 | 1/2006 | Bates | |
| 7,122,801 B2 | 10/2006 | Favro et al. | |
| 7,716,987 B2 | 5/2010 | Sathish et al. | |
| 8,322,221 B1 | 12/2012 | Sathish et al. | |
| 2014/0118530 A1 | 5/2014 | Holmes et al. | |
| 2015/0137411 A1 | 5/2015 | Matsunuaga et al. | |

OTHER PUBLICATIONS

Ansley et al. "Current Nondestructive Inspection Methods for Aging Aircraft", U.S. Department of Transportation, Federal Aviation Administration, Jun. 1992, p. 1-91.*

AMCP "Quality Assurance: Guidance to Nondestructive Testing Techniques" Apr. 1970, p. 1-172.*

Hull et al. "Non-Destructive Testing", Macmillan Education, 1988, p. 8-12 (Year: 1988).*

Kaitlin Kollins et al., Matrix Crack Density of Ceramic Matrix Composites poster, The Air Force Research Laboratory, at least as early as Sep. 3, 2015.

* cited by examiner

NONDESTRUCTIVE INSPECTION OF COMPOSITE MATERIALS

CROSS-REFERENCE TO RELATED APPLICATIONS

This application is a non-provisional application of, and claims priority under 35 USC § 119(e) to, U.S. provisional application 62/349,992, filed Jun. 14, 2016, the entire contents of which are incorporated by reference.

TECHNICAL FIELD

This disclosure relates to nondestructive inspection technology, and in particular to systems and methods associated with nondestructive inspection technology for detecting defects using fluorescent penetrants in composite material components, such as as ceramic matrix composite (CMC) components.

BACKGROUND

Composite materials are increasingly being used by industries for their desirable property characteristics. For example, aircrafts and their components include composite materials due to their lighter weight and improved thermal characteristics when compared to traditional materials. One common example of a composite material is a ceramic matrix composite (CMC). In ceramic matrix composites, a ceramic fiber such as silicon carbide in the form of a cloth or woven fabric is embedded in a ceramic matrix such as silicon carbide.

Inspection of such composite material component is performed to determine whether defects exist and whether the part is serviceable. Examples of such defects include cracks, porosity, delamination and other types of defects which could occur during normal manufacture or engine service. Nondestructive inspection may also be utilized to help determine whether the component may be reworked. For example, nondestructive inspection may include (but is not limited to) visual examination, ultrasonic testing, infrared (IR) testing, eddy current testing, and computed tomography (CT). However, these methods may involve a high level of skill, may be time intensive, and may be cost prohibitive.

Fluorescent or dye penetrant inspection (FPI) may provide a low cost means for nondestructive inspection. However, unlike metal materials, the number of fluorescing locations in CMC material may be high, creating a surface which is difficult to accurately inspect. A developer, as is part of a standard FPI inspection, is applied to the surface of the component to wick and cause the penetrant containing the fluorescent dye, which was retained in the cracks or surface flaws, to be drawn up out of the surface defects by capillary action and to "bleed" through the developer. However, using a developer on CMC components contributes to excessive bleed back and to even more noise in the inspection data. In both cases, due to the noise of visual data, the inspector is challenged to discriminate between defect and nondefect locations. Therefore, present approaches for the nondestructive inspection of ceramic matrix composite components suffer from a variety of drawbacks, limitations, and disadvantages. There is a need for the inventive nondestructive inspection systems and methods of composite material components, such as CMC components, disclosed herein.

BRIEF SUMMARY

Disclosed herein are embodiments of systems and methods associated with nondestructive inspection of composite material components, such as ceramic matrix composite (CMC) components. In one embodiment, a method of inspecting a CMC component with a fluorescent penetrant is included. The method may include one or more of the following steps. A step includes applying a fluorescent penetrant to a surface of a CMC component to be inspected. A step includes applying a first washing fluid to the surface of the CMC component having the fluorescent penetrant to remove an initial portion of the fluorescent penetrant from the surface, leaving the surface with a first amount of the fluorescent penetrant. A step includes applying an emulsifying agent to the surface of the CMC component having the first amount of the fluorescent penetrant. A step includes applying a second washing fluid to the surface of the CMC component having the first amount of the fluorescent penetrant and the emulsifying agent to remove another portion of the fluorescent penetrant from the surface, leaving the surface with a second amount of the fluorescent penetrant less than the first amount. A step includes covering fully the surface of the CMC component having the second amount of the fluorescent penetrant with a solvent washing agent to remove excess bleed back from the surface.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Disclosed herein are examples of systems and methods associated with nondestructive inspection of composite material components, such as ceramic matrix composite (CMC) components, using fluorescent penetrants for detecting undesirable defects in such components. Examples of such defects include voids, cracks, incorrect porosity, delamination, foreign object debris, and other types of defects occurring through manufacture or service. CMC components naturally have what appears to be a roughened undulated pattern surface that is inherent with the fabric strands of fiber, fiber tows, woven fabric, etc. that is capable of holding penetrant. Unlike metal materials, the number of fluorescing locations from the penetrant in CMC materials may be high, thereby being difficult for the inspector to resolve the surface.

Furthermore, treating the component after the penetrant application with a developer or powder substance as is standard practice during FPI will cause even more fluorescent dye penetrant in the void to wick out into the developer or bleed back excessively along the exterior component surface. Bleed back references the ability of the penetrant to bleed out of any surface void onto the component's surface without returning into the void again subsequent to removal of the penetrant. However, a developer tends to agglomerate and cake and hence this reduces the sensitivity to penetrant inspection of very small defects in the surface being tested, contributing to the visual noise and difficulty in inspection. The systems and methods described herein may aid in the visual inspection of such components without the use of a developer and without the step of applying a developer. The systems and methods described herein may be completed in less time and at lower costs, allowing an inspector to more effectively and efficiently discriminate between undesirable defects and acceptable surface discontinuities (or nondefect locations) for a CMC component.

Figure 1:
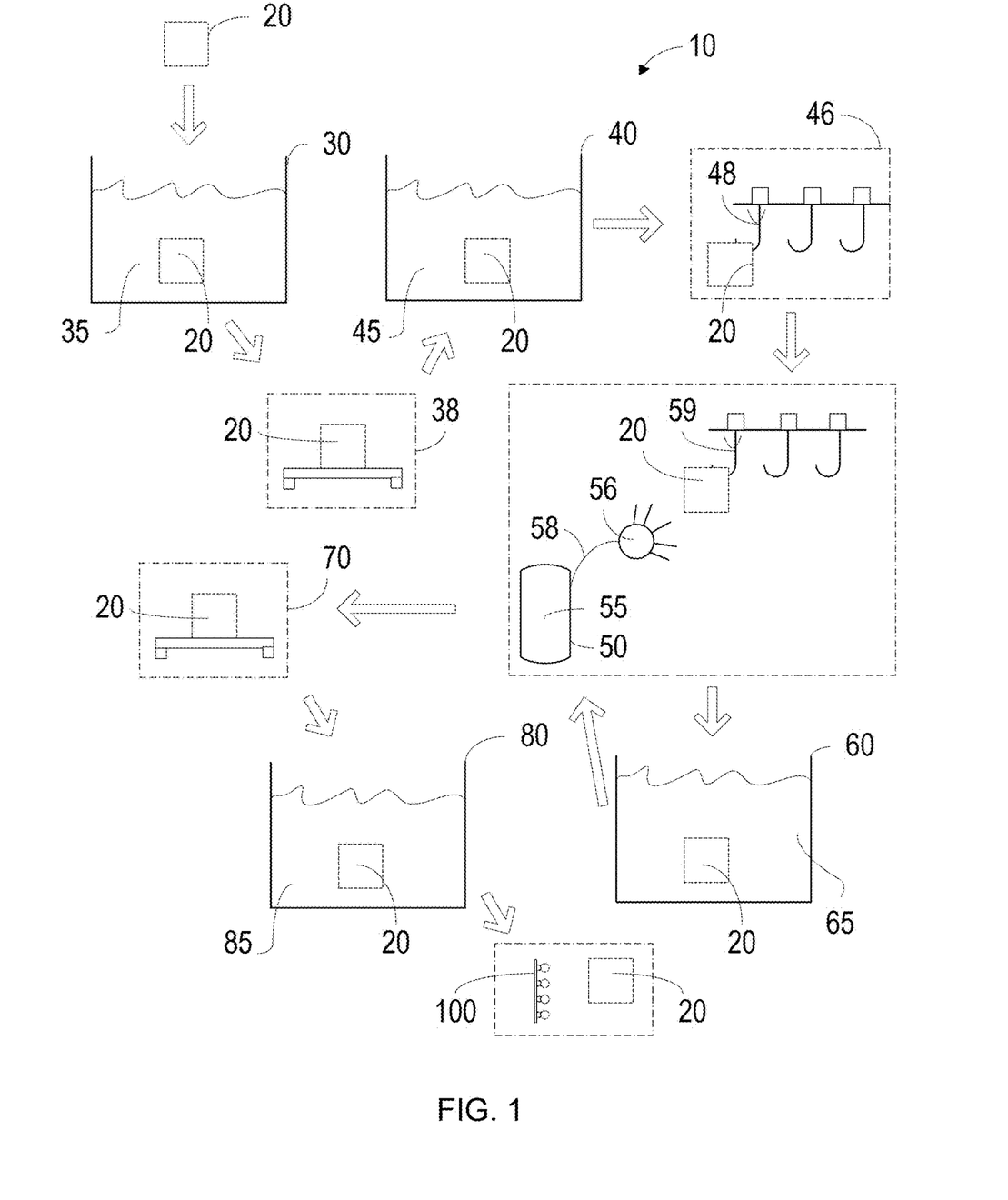
FIG. 1 illustrates an example of a nondestructive inspection system for detecting a defect in a component.

FIG. 1 illustrates an example of a nondestructive inspection system 10 used to inspect a component 20 (shown in dotted lines) made of composite materials, such as CMC. The component 20 may be used in any industry, such as aerospace, marine, and mining, to name a few. Examples of the CMC components may include, but are not limited to, any component of a gas turbine engine, such as an airfoil, a turbine blade, a vane, an endwall, and/or a seal segment, which may be used to power aircraft, watercraft, power generators, and the like.

The component 20 of, e.g., CMC generally comprises a ceramic matrix resins and a fiber preform embedded within the matrix. Illustratively, the fiber preform of the CMC may comprise any suitable fiber. For example and without limitation, the fiber may be carbon fiber, oxide ceramic fiber, silicon carbide fiber (SiC), and silicon-nitro-carbide (SiNC) fiber. The fiber may be stoichiometric or non-stoichiometric or a combination thereof. It will also be appreciated that the preform or article could consist of any suitable arrangement of fibers including for example and without limitation unidirectional fibers, woven fabric, braided fiber, and the like. It will be appreciated that multiple fiber bundles or tows of the fibers may be formed into 2D or 3D preforms that meet the desired component size and shape. The fibers and matrix are arranged and manufactured to form a composite material, which is usually then formed or otherwise machined into the component 20. An environmental barrier coating material may be applied to the CMC body that is resistant to environmental attack. The environmental attack may be from oxygen, water vapor, or any other compound that may otherwise degrade the integrity or performance of a component that is coated by the environmental barrier coating material. The environmental barrier coating material may be based on a silicate, such as a rare earth silicate or other silicate. Examples of environmental barrier coating material may include a Ytterbium silicate, a Yttrium silicate, barium strontium aluminosilicate, and/or mullite.

The system 10 may include a cleaning station such as a source 30 of a cleaning agent 35 to facilitate the cleaning and removal of any contaminants, such as adherent matters and oil and fats, from the exposed surface or surfaces of the component 20. The source 30 shown includes a container of the cleaning agent 35 at a cleaning agent temperature, and the container may be sized to receive the component. The cleaning agent 35 may be applied to the component 20, if needed, by various means for a duration of a cleaning time. The component 20 may be dipped partially or immersed fully within the cleaning agent 35. The cleaning agent 35 or degreaser facilitates the washing away of contaminants that inhibit the effectiveness of penetrants. The cleaning agent 35 may be applied by other means, such spraying from a nozzle and hose fluidly coupled to the cleaning source that is pressurized, pouring and/or brushing the cleaning agent from the cleaning source, or any other application means known in the art. The cleaning agent 35 may be active in still, or further agitated by mixing or ultrasonically. Other cleaning techniques at such a cleaning station, in addition to or instead of the source 30 of the cleaning agent 35, may include, for example, a mechanical abrasion-type cleaning technique, stripping, chemical etching, blasting, vapor degreasing, ultrasonic degreasing, and the like. Suitable cleaning agents 35 may include any one or combination of degreasing solvents, such as, for example, at least one of acetone, alcohol, methanol, ethanol, and mineral spirits.

The system 10 may include multiple drying stations, as will be described. Each drying station may be configured differently depending on the fluid applied to the component and purpose of drying. For example, when solvent is used as the cleaning agent 35, the solvent may be allowed to evaporate from the component as a part of the drying. After application of the cleaning agent 35 to the component 20, the cleaned component 20 may be dried at a first drying temperature at a first drying station 38 for a first drying time. The cleaned component 20 may be suspended from a hanger for drip drying, laid down on a table surface, or by other means known in the art. Compressed air from a compressed air system, or shop air, may be used to facilitate drying. During drying, the component may be rotated to ensure even drying across the surface. The temperature environment of the component for drying may be monitored and controlled. A first drying temperature at room temperature (about 60 to 90 degrees Fahrenheit) may be sufficient. Greater than room temperature may facilitate faster drying. In one example, a heat source, such as an electric or gas heater or oven, may be used to increase the temperature environment to a temperature higher than room temperature that is high enough to facilitate vaporization of the degreaser but low enough to avoid vaporization or sublimation of the penetrant. Times and temperatures may vary depending on the type of cleaning agent, penetrant, solvent washing agent, emulsifying agent, the size and shape of the component, the movement of air, as well as other factors as appreciated by those of ordinary skill in the art.

The system 10 may include a penetrant applicator 40 to facilitate the application of a penetrant 45 to the exposed surface or surfaces of the cleaned component 20. The penetrant 45 may be applied after sufficient drying of the component 20 at the first drying station 38 for the first drying time after initially cleaning with the cleaning agent 35. In one example, the penetrant 45 is a fluorescent penetrant of any sensitivity level that contains a dye or several dyes that fluoresce when exposed to ultraviolet radiation. The florescent dye penetrants are classified based on the strength or detectability of the indication that is produced for a number of very small and tight fatigue cracks. The five sensitivity levels are, as follows: Level ½—Ultra Low Sensitivity; Level 1—Low Sensitivity; Level 2—Medium Sensitivity; Level 3—High Sensitivity; and Level 4—Ultra-High Sensitivity. The penetrant 45 may be applied to the component 20 by various means for a penetrant dwell time.

The penetrant 45 may be applied by spraying, electrostatic spraying, brushing, or immersing the component 20 in a penetrant container of penetrant (as shown) for a penetrant dwell time, and the container may be sized to receive the component. Once the penetrant 45 is applied to the component 20, the penetrant dwell time should be sufficient to allow the penetrant 45 to enter or be drawn into any surface discontinuity present. For instance, the penetrant dwell time of the component 20 during application of the penetrant 45 may depend on the shape, material, porosity and defect of the component, the viscosity and density of the penetrant, the atmospheric pressure, among other factors as appreciated by one of ordinary skill in the art. In an example, when the component 20 is immersed fully in the penetrant that the penetrant dwell time may be less than about one minute. Considerations to find a balance between the minimal time for the penetrant to enter into the surface discontinuities sufficient for inspection and too long of time where additional cleaning and removal steps would be needed.

After application of the penetrant 45 to the component 20, the component 20 may be dried at a second drying temperature at a second drying station 46 for a second drying time. The second drying station 46 may be similar as described above with the first drying station 38. The drying conditions at the second drying station 46 may help avoid the uneven pooling or settling of the penetrant 45 on the component 20. The component 20 with the penetrant 45 may be suspended from a hanger for the period of second drying time. In an example, as shown, the component 20 may be suspended from a rotating device or a rotating hanger 48 that may be rotated up to about 0.2 RPMS. As known, the hanger would have an end or element capable of detachably coupling to a portion of the component. The hanger may also include a shaft coupled between the coupling end and an end coupled to an electric motor powered for rotation.

The system 10 may include a source 50 of fluid washing agent 55 to facilitate the rinsing and removal of excess penetrant 45 from the exposed surface or surfaces of the component 20. The fluid washing agent may remove an initial portion of the penetrant 45 from the surface, leaving the surface of the component with a first amount of the penetrant 45 that is less than the initial penetrant applied. The fluid washing agent 55 may be water or other cleaning substance diluted with water. The fluid washing agent 55 may be applied to the component by various means for a fluid washing time. The component 20 may be dipped partially or immersed fully into the fluid washing agent 55. The fluid washing agent 55 may be applied by other means, such spraying from a nozzle, pouring and/or brushing the fluid washing agent, or other means known in the art.

In an example shown, the fluid washing agent 55 is applied by selectively spraying from a nozzle unit 56 and a hydraulic line or hose 58 fluidly coupled to the source 50 of fluid washing agent 55, such as a container or reservoir that is pressurized by a compressor means as known in the art. The nozzle unit 56 may include a valve remotely controlled or selectively controlled by a trigger for turning on or shutting off the spraying action, as known in the art. The component 20 may be suspended from a hanger during the fluid washing time with the fluid washing agent. In an example as shown, the component 20 may be suspended from a rotating hanger 59 that may be rotated up to about 0.2 RPMS.

The system 10 may include a source 60 of emulsifying agent 65 to facilitate the lifting of penetrant from the surface discontinuities of the washed component 20 and the breaking up the penetrant into small quantities to prevent these smaller penetrant pieces from reattaching to the surface of the washed component 20 after the initial fluid washing step. The emulsifying agent 65 may be applied to the component 20 by various means for an emulsifying time. The component 20 may be dipped partially or immersed fully into a container of the emulsifying agent 65, and the container may be sized to receive the component. The emulsifying agent 65 may be applied by other means, such spraying from a nozzle and hose fluidly coupled to the emulsifier source that is pressurized, pouring and/or brushing the emulsifying agent from the emulsifier source, or any other means known in the art. The emulsifying agent 65 may be active in still, or further agitated by mixing or ultrasonically. Suitable emulsifying agents 65 may be hydrophilic or water washable and may contain detergents including solvents and surfactants. The emulsifying time should be sufficient for the emulsifying agent 65 to react with the penetrant 45 on the surface and surface discontinuities of the component 20. Shorter times would not allow the emulsifying agent 65 to make its way into surface discontinuities for reaction with the trapped penetrant in the surface discontinuities, while longer times allow for excessive reaction and too little penetrant remaining in the surface discontinuities.

The system 10 may include another second fluid washing source to facilitate the rinsing and removal of excess emulsified penetrant from the exposed surface or surfaces of the component 20 after the application the emulsifying agent. This second washing may facilitate the removal of the penetrant and the emulsifying agent from the component, leaving the surface with a second amount of the fluorescent penetrant less than the first amount after the first washing. In an example, the second fluid washing source may be the fluid washing source 50 where the component is rinsed.

After being rinsed, the component 20 may be dried at a third drying station 70, which is similar as described above with the first drying station 38. The drying at the third drying station 70 may be for a third drying time and a third drying temperature.

The system 10 may include a source 80 of solvent washing agent 85 to facilitate the removal of excessive bleed back or residual penetrant after application of the emulsifying agent 65 to the component 20. The solvent washing agent 85 may be applied to the component 20 by various means for a period of solvent washing time. The component 20 may be dipped partially or fully immersed into a container of the solvent washing agent 85 so long as the entire surface is covered, and the container may be sized to receive the component. The solvent washing agent 85 may be applied by other means, such spraying from a nozzle and hose fluidly coupled to the solvent washing source that is pressurized, pouring and/or brushing the solvent washing agent from the solvent washing source, or any other application means known to one skilled in the art. The solvent washing agent 85 may be active in still, or further agitated by mixing or ultrasonically. Suitable solvent washing agents 85 may include any one or combination of solvents, such as, for example, at least one of acetone, alcohol, methanol, ethanol, and mineral spirits.

After the component 20 is washed with the solvent agent 85, the component is permitted to dry or allow the solvent washing agent 85 to evaporate. After drying or full evaporation, the component 20 may be further wiped with a lint free lab wipe cloth to remove bleed back.

After the removal of the solvent washing agent and excessive bleed back, the component 20 is ready for inspection, preferably nondestructive visual inspection. Inspection may be performed with an ultraviolet (UV) light source 100 or LED black light configured to facilitate the fluorescence of the remaining penetrant on the component. For example, the penetrant may be excited by UV light of about 330 to about 365 nm wavelength and emit visible light somewhere in the green-yellow range between 520 and 580 nm.

An image capture device (not shown) may be used during the inspection with the UV light source 100 in order to analyze inspection data in real time. For example, a camera capable of capturing the visible spectrum, a photo-emission sensor for various wavelengths including but not limited to ultraviolet and x-ray, detectors capable of sensing electromagnetic radiation, thermal imaging, other light sources (e.g., laser).

Figure 2:
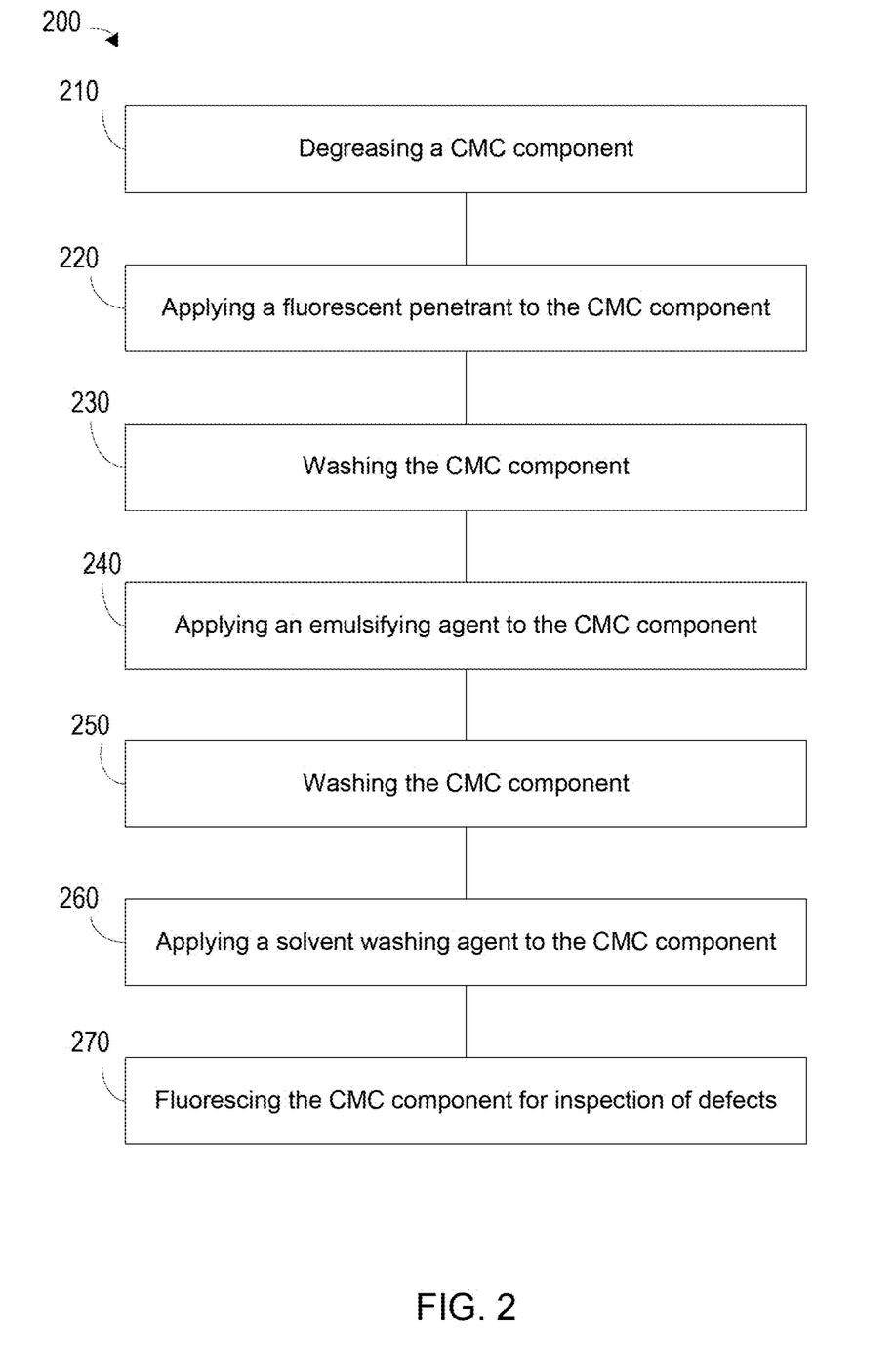
FIG. 2 is a flow diagram, depicting an exemplary method of detecting a defect in a component.

FIG. 2 illustrates a flow diagram of an exemplary method 200 of detecting a defect in the component 20 comprising CMC. The method 200 may include one or more of the following steps, as well as additional steps described herein. Step 220 includes applying a fluorescent penetrant 45 to the component 20, for example, such as but not limited to, dipping the component in a fluorescent penetrant bath. Enough time should be given to allow the penetrant to penetrate discontinuities in the surface of the component. The component may be cleaned or degreased with the cleaning agent 35, for example, in still, agitated, or ultrasonically agitated, prior to the application of the penetrant 45, as shown in Step 210. The component 20 may be dried after being cleaned or degreased with the cleaning agent 35 prior to the application of the penetrant 45. As described above, the component 20 may be dried after the application of the cleaning agent 35 at the first drying station 38 and after the application of the penetrant 45 at the second drying station 46.

Step 230 includes washing the component 20 by applying the fluid washing agent 55 to the component 20 to facilitate the rinsing and removal of excess penetrant from the exposed surface or surfaces of the component 20. A remaining portion of the penetrant may still remain in the surface discontinuities including the defects if any are present. In an example, an initial portion of the fluorescent penetrant is removed from the surface of the component, leaving the surface with a first amount of the fluorescent penetrant. The component may be dried after the application of the first fluid washing agent.

Step 240 includes applying an emulsifying agent 65 to the component 20 having the first amount of the penetrant remaining on the surface. The emulsifying agent may facilitate the lifting of a portion of the remaining penetrant from the surface discontinuities and the breaking up the lifted penetrant into small quantities to prevent these smaller penetrant pieces from reattaching to the surface of the component 20 or re-entering the surface discontinuities.

Step 250 includes washing the component 20 having the first amount of the penetrant and the emulsifying agent by applying a second fluid washing agent to the component. This washing may remove another portion of the penetrant from the surface that was lifted and broken into pieces by the emulsifying agent and any remaining emulsifying agent. After the washing, the surface is left with a second amount of the fluorescent penetrant less than the first amount. This remaining portion of the penetrant may still remain in the surface discontinuities including the defects if any are present. The component may be dried after the application of the second fluid washing agent.

Step 260 includes applying the solvent washing agent 85, for example, in still, agitated, or ultrasonically agitated, to the component 20 having the small remnant of penetrant within surface discontinuities. For example, the surface of the CMC component with the second amount of the penetrant may be fully covered with a solvent washing agent to remove excess bleed back from the surface. In an example, the component 20 may be fully immersed into a bath of solvent washing agent 85. It has been found that the application of the solvent washing agent 85 without the application of a developer (as conventionally done) inhibits excessive bleed back and removes residual penetrant from the surface of the CMC component sufficiently for an operator using fluoroscopic inspection to determine defects. Bleed back may be further removed after the application of the solvent washing agent 85 with a lint free lab wipe. The component may be allowed to dry or the solvent washing agent allowed to evaporate prior to inspection.

Step 270 includes fluorescing the CMC component after the removal of the bleed back by applying a UV light to the component for the nondestructive visual inspection for defects, for example, surface defects, with the component. Additional inspection and assessment, via, for example, an image capture device of the component may occur to obtain additional information about the component.

EXAMPLES

Example 1

In one example, the method of detecting a defect in the CMC component. Here the component tested and inspected was a flat plate made of CMC material of a matrix of ceramic and a fiber embedded within the matrix and a flat plate made of CMC woven material. The component is cleaned or degreased by immersing the component in a cleaning agent of still acetone or other solvent at room temperature. The component is dried after being cleaned or degreased with forced shop dry compressed air at room temperature. The component is then immersed in a fluorescent penetrant bath (Level 2 sensitivity) for about one minute. The component is then drip dried, while being rotated at 0.2 revolutions per minute for a drying time of about 15 to 20 minutes at room temperature or a sufficient time to allow the penetrant to enter the entire surface discontinuities. After being dried, the component is washed with a first fluid washing agent of water by forced spraying for about 20 seconds while the component is being rotated on a hanger at 0.2 revolutions per minute. Afterwards, the component is immersed in a hydrophilic emulsifying agent bath for a period of about two minutes. The component is then washed with a second fluid washing agent of water by forced spraying for about 20 seconds while the component is being rotated on a hanger at 0.2 revolutions per minute. The component is then dried with heated forced air at an environmental temperature of greater than room temperature for a period of about ten minutes. No developer is used during the period of time between the emulsifying step and the solvent washing bath, that is, after washing with the emulsifying agent and drying the component or prior to the solvent wash bath. The component is then immersed in a solvent wash bath of acetone (static and/or flowing) to remove excess bleed back. If needed, any remaining excess bleed back may be removed with a lint free lab wipe. The component is then inspected with a LED black light. As appreciated by one skilled in the art, the method steps involving times and temperatures may vary depending on the type of cleaning agent, penetrant, solvent washing agent, emulsifying agent, the size and shape of the component, the movement of air, as well as other factors.

As shown in FIGS. 3A-3B and FIGS. 4A-4B, the visual evaluation of sample CMC components revealed surfaces with acceptable contrast between undesirable defects and acceptable surface discontinuities.

Figure 3A:
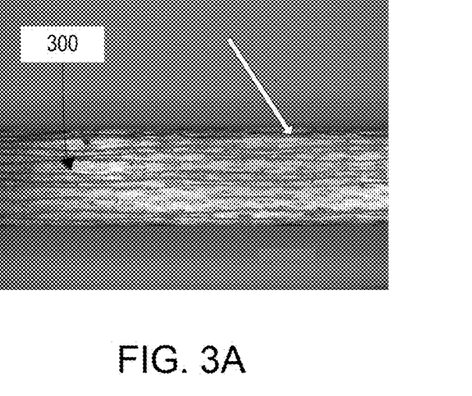
FIG. 3A is a photomicrograph showing a region of a sample component with a defect under white light prior to being subjected to the systems and methods described herein.
Figure 3B:
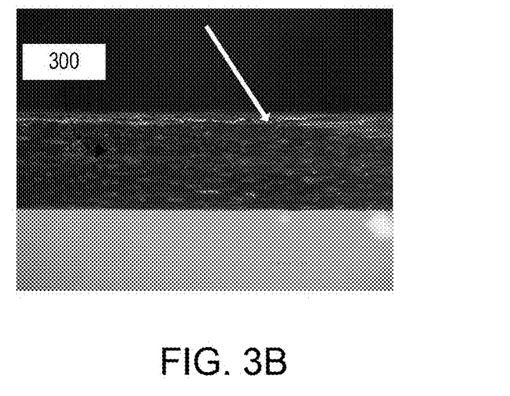
FIG. 3B is a photomicrograph showing the region of the sample component with the defect shown in FIG. 3A, under UV light after being subjected to the systems and methods described herein.

FIGS. 3A-3B show a sample component 300 of flat plate made of CMC material of a matrix of ceramic and a fiber embedded within the matrix. FIG. 3A reveals the microstructures of the component 300 under white light prior to being subjected to the systems and methods described herein. It is noted that the surface of CMC material appears roughened, leaving many discontinuities in the surface. A crack was formed (indicated by the arrow) into the component sample as an example defect. FIG. 3B reveals the microstructures of the component 300 under black UV light after being subjected to the systems and methods described herein. As may be seen, visual intensity of the fluorescent penetrant remaining in the defective crack compared to the porous surface is noticeable.

Figure 4A:
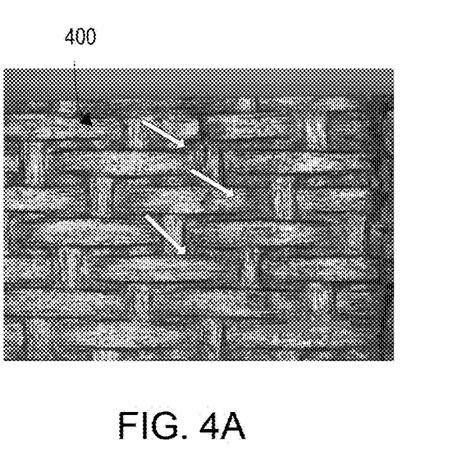
FIG. 4A is a photomicrograph showing a region of a sample component with a defect under white light prior to being subjected to the systems and methods described herein.
Figure 4B:
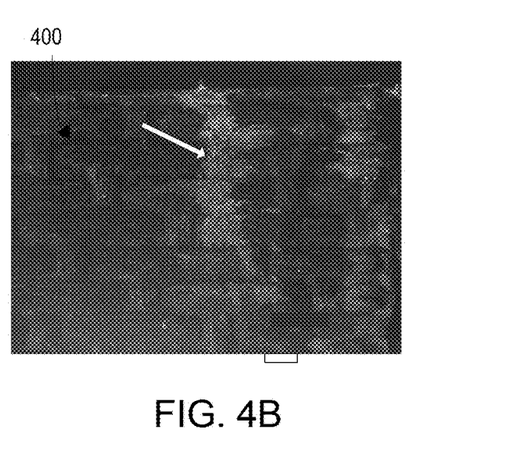
FIG. 4B is a photomicrograph showing the region of the sample component with the defect shown in FIG. 4A, under UV light after being subjected to the systems and methods described herein.

FIGS. 4A-4B show a sample component 400 of flat plate made of CMC woven material. FIG. 4A reveals the microstructures of the component 400 under white light prior to being subjected to the systems and methods described herein. It is noted that the surface of CMC material appears roughened and having many surface disruptions due to the weave, leaving many discontinuities in the surface. Cracks were formed (indicated by the arrow) into the component sample as an example defect. FIG. 4B reveals the microstructures of the component 400 under black UV light after being subjected to the systems and methods described herein. As may be seen, visual intensity of the fluorescent penetrant remaining in the defective crack compared to the porous surface is noticeable.

The results have shown an improved system and method of nondestructive inspection of CMC components or preparing for inspection of such components. Applying the solvent washing agent instead of using a developer can be shown to inhibit the excessive bleed back and improve visual inspection by an inspector of such components with FPI in less time and at lower costs. Hence, an inspector may more effectively and efficiently discriminate between undesirable defects and acceptable surface discontinuities (or nondefect locations) for a CMC component.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

Furthermore, the advantages described above are not necessarily the only advantages, and it is not necessarily expected that all of the described advantages will be achieved with every embodiment.

What is claimed is:

1. A method of inspecting a ceramic matrix composite (CMC) component with a fluorescent penetrant, the method comprising:
   applying a fluorescent penetrant to a surface of a CMC component to be inspected, the surface being a porous surface including acceptable surface discontinuities comprising fabric strands of fiber, fiber tows, woven fabric or some combination thereof;
   applying a first washing fluid to the surface of the CMC component having the fluorescent penetrant to remove an initial portion of the fluorescent penetrant from the surface, leaving the acceptable surface discontinuities and undesirable surface discontinuities in the surface with a first amount of the fluorescent penetrant, the undesirable surface discontinuities comprising cracks, delamination or some combination thereof;
   applying an emulsifying agent to the surface of the CMC component having the first amount of the fluorescent penetrant, the emulsifying agent comprising a solvent;
   applying a second washing fluid to the surface of the CMC component having the first amount of the fluorescent penetrant and the emulsifying agent to remove the emulsifying agent and another portion of the fluorescent penetrant from the surface, leaving the acceptable surface discontinuities and the undesirable surface discontinuities with a second amount of the fluorescent penetrant less than the first amount;
   applying a solvent washing agent to the surface of the CMC component, instead of a developer, to inhibit excessive bleed back of the florescent penetrant from the undesirable surface discontinuities onto the porous surface of the CMC component, the solvent washing agent applied by covering fully the surface of the CMC component having the second amount of the fluorescent penetrant with the solvent washing agent to remove residual florescent penetrate from the porous surface of the CMC component and excess bleed back from the undesirable surface discontinuities to the fabric strands of fiber, fiber tows, woven fabric or some combination thereof included in the porous surface of the CMC component and capable of holding the fluorescent penetrant;
   removing the solvent washing agent from the CMC component; and
   applying an ultraviolet light to the CMC component next after removal of the solvent washing agent that fully covered the surface of the CMC component to perform a visual inspection of the discontinuities.

2. The method of claim 1, wherein the solvent washing agent includes at least one of acetone, alcohol, methanol, ethanol, or mineral spirits.

3. The method of claim 1, wherein during the covering step, the CMC component is fully immersed into the solvent washing agent.

4. The method of claim 1, wherein a developer is not applied to the CMC component after the applying an emulsifying agent step or the covering step.

5. The method of claim 1, wherein the solvent washing agent is within a container.

6. The method of claim 1, further comprising drying the CMC component after the applying the second washing fluid step and prior to the covering step.

7. The method of claim 1, further comprising applying a cleaning agent to the CMC component prior to the applying the fluorescent penetrant step.

8. The method of claim 7, further comprising drying the CMC component after the applying the cleaning agent step and prior to the applying the fluorescent penetrant step.

9. The method of claim 1, further comprising drying the CMC component after the applying the fluorescent penetrant step and prior to the applying the first washing fluid step.

10. The method of claim 1, wherein the CMC component is rotated during the drying step and the applying the first washing fluid step.

11. The method of claim 1, further comprising drying the CMC component after the covering fully the surface of the CMC component step and prior to the applying an ultraviolet light step.

12. A method of inspecting a ceramic matrix composite (CMC) component with a fluorescent penetrant, the method comprising:
    degreasing the CMC component with a cleaning agent;
    immersing the CMC component in a bath of a fluorescent penetrant;
    washing the CMC component having the fluorescent penetrant with a first washing agent to remove an initial portion of the fluorescent penetrant from a surface of the CMC component, the surface being a porous surface including acceptable surface discontinuities comprising fabric strands of fiber, fiber tows, woven fabric or some combination thereof, the first washing leaving the acceptable surface discontinuities and undesirable surface discontinuities in the surface with a first amount of the fluorescent penetrant, the undesirable surface discontinuities comprising cracks, delamination or some combination thereof;
    applying an emulsifying agent to the CMC component having the first amount of the fluorescent penetrant to lift the fluorescent penetrant from the surface discontinuities and prevent reattachment of the fluorescent penetrate to the surface or the surface discontinuities after applying the first washing fluid, the emulsifying agent comprising a solvent;
    washing the CMC component having the first amount of the fluorescent penetrant and the emulsifying agent with a second washing fluid to remove the emulsifying agent, and another portion of the fluorescent penetrant from the acceptable surface discontinuities and the undesirable surface discontinuities, leaving the acceptable surface discontinuities and the undesirable surface discontinuities with a second amount of the fluorescent penetrant less than the first amount;
    drying the CMC component having the second amount of the fluorescent penetrant;
    immersing the CMC component with the second amount of the fluorescent penetrant under a solvent washing agent, instead of a developer, the solvent washing agent being a solvent to remove residual florescent penetrate from the porous surface of the CMC component and excess bleed back from the undesirable surface discontinuities onto the fabric strands of fiber, fiber tows, woven fabric or some combination thereof included in the porous surface of the CMC component, leaving the acceptable surface discontinuities of the CMC component and the undesirable surface discontinuities with a remaining amount of the fluorescent penetrant less than the second amount; and
    fluorescing the CMC component with the remaining penetrant with an ultraviolet light to allow for visual inspection of the surface discontinuities in the surface of the CMC component.

13. The method of claim 12, wherein the solvent washing agent includes at least one of acetone, alcohol, methanol, ethanol, or mineral spirits.

14. The method of claim 12, wherein a developer is not applied to the CMC component during a period of time between the emulsifying agent step and the immersing step.

15. The method of claim 12, wherein the solvent washing agent is in a container sized to receive the CMC component.

16. The method of claim 1, wherein the step of removing the solvent washing agent from the CMC component comprises removing the solvent washing agent from the CMC component without applying the developer, and wherein the step of applying an ultraviolet light to the CMC component next after removal of the solvent washing agent comprises applying the ultraviolet light to the CMC component next after removal of the solvent washing agent without applying the developer.

17. The method of claim 12, wherein the step of fluorescing the CMC component with the remaining penetrant with an ultraviolet light comprises the step of fluorescing the CMC component with the remaining penetrant with the ultraviolet light without applying a developer.

18. The method of claim 1, wherein the step of applying an ultraviolet light to the CMC component next after removal of the solvent washing agent that fully covered the surface of the CMC component to perform a visual inspection of the discontinuities comprises applying the ultraviolet light to the CMC component next after removal of the solvent washing agent, in the absence of any developer ever having been applied to the discontinuities, to perform the visual inspection.

19. The method of claim 12, wherein the step of fluorescing the CMC component with the remaining penetrant with an ultraviolet light to allow for visual inspection of the surface discontinuities in the surface of the CMC component comprises the step of fluorescing the CMC component, in the absence of any developer ever having been applied to the surface discontinuities, to allow for visual inspection.

* * * * *